Oct. 13, 1936.  W. R. HARDING  2,057,521
ARC WELDING SYSTEM
Filed Jan. 10, 1929
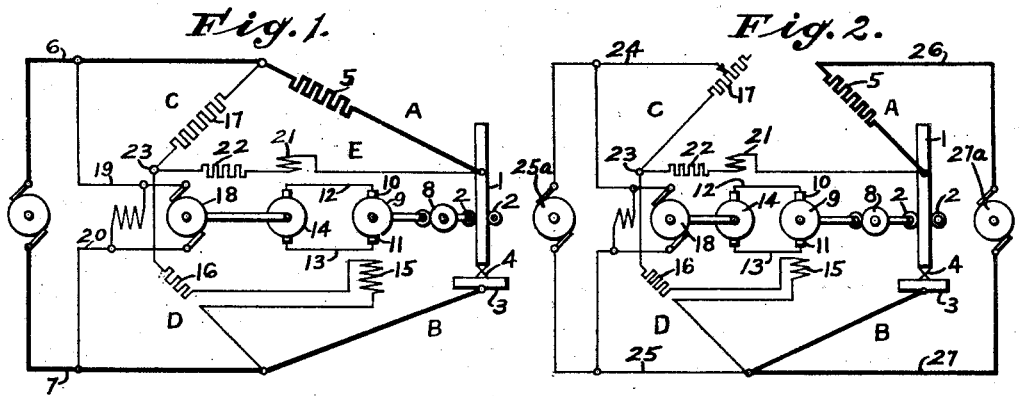
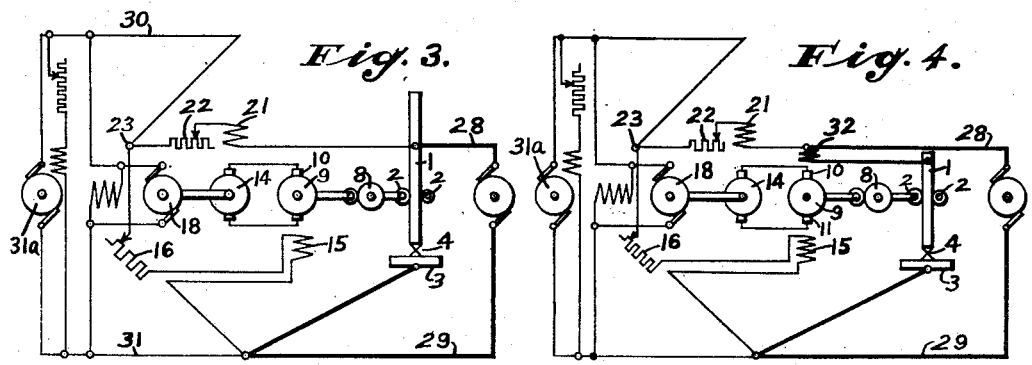
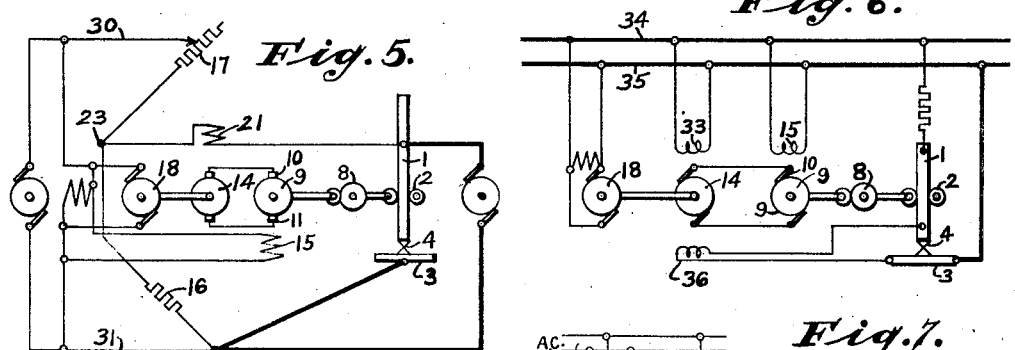
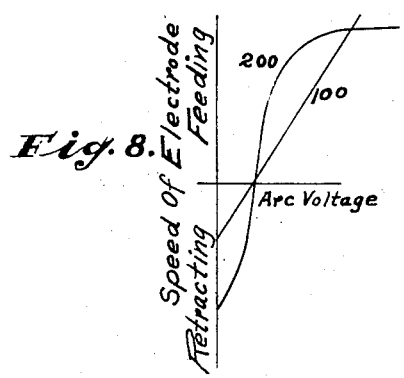
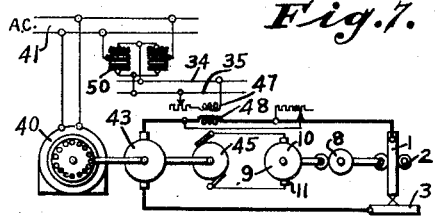
INVENTOR
William R. Harding
BY
Wesley H. Carr
ATTORNEY Patented Oct. 13, 1936

2,057,521

UNITED STATES PATENT OFFICE 2,057,521

ARC WELDING SYSTEM

William R. Harding, Wilkinsburg, Pa., assignor to Westinghouse Electric & Manufacturing Company, a corporation of Pennsylvania Application January 10, 1929, Serial No. 331,497

24 Claims. (Cl. 219—8)

My invention relates to arc welding and particularly to automatic machines wherein means are provided to regulate the rate of feeding a fusible electrode toward the welding region.

An object of my invention is to provide an improved machine which is simple in construction and positive in its action.

A further object of my invention is to provide an automatic arc welding apparatus which is rapid in its response to arc conditions when welding at a high rate of speed.

A further object of my invention is to provide a welding apparatus in which a reversible electric motor controlled by an electrical condition of the welding circuit is arranged to strike and to regulate the arc to maintain the same at a predetermined length.

A further object of my invention is to provide an arc welding apparatus in which the electrodes are caused to approach and recede from each other in accordance with the amplified variation of potential of the welding arc from a predetermined value.

A further object of my invention is to provide a method and apparatus for continuously feeding or retracting metallic welding electrodes at a speed approximating the rate at which the arc fuses the electrode material.

In practicing my invention, I provide a variable-speed electrode-feeding motor operating in response to arc fluctuations of the type disclosed in United States Patent No. 315,564, issued April 14, 1885, to F. M. Sparrow, wherein the patentee discloses an arrangement that comprises a pair of feed rolls, between which the electrode is held, and a motor that is directly connected to the feed rolls and operated in response to the variation of the arc voltage from a predetermined value.

In the automatic welding machines of the prior art, as well as in the machine disclosed by the above-mentioned patentee, a substantial time-lag exists in the mechanical and magnetic elements of the electrode-feeding mechanism. When moving the electrode along the work surface at welding speeds of 10 to 20 inches a minute, this time lag does not materially affect the quality of the deposited metal, but, as the speed is increased above about 40 inches a minute, the contour of the deposit becomes irregular and its surface deeply pitted. This is attributed to irregular deposition of the metal, and to excessive oxidation caused by failure to maintain an adequate and constant arc length.

In my present invention, I provide for an increased sensitivity of response of my feeding mechanism to arc variations by impressing upon the armature of the electrode feed motor a separate source of voltage which is proportional to, but larger than, the voltage difference between the arc potential and a substantially fixed potential.

With the foregoing and other objects in view, my invention consists in the principles of construction and methods of operation hereinafter described and claimed, and illustrated in the accompanying drawing, wherein Fig. 1 illustrates, diagrammatically, an embodiment of my invention, as applied to constant-potential welding systems.

Fig. 2 illustrates, diagrammatically, a modified system in which the Wheatstone-bridge circuit shown in Fig. 1 is split to provide separate sources of constant-potential energy for both the arc and the control circuits.

Fig. 3 is a diagrammatical illustration of a further modification wherein the arc energy is derived from a constant-current-energy source.

Fig. 4 illustrates, diagrammatically, a modification of the circuit disclosed in Fig. 3.

Fig. 5 illustrates, diagrammatically, another modification wherein the field coil of the feed motor is shown separately excited.

Figs. 6 and 7 illustrate, diagrammatically, other forms of my invention for amplifying changes in arc conditions.

Fig. 8 is a curve chart showing the speed-response characteristic of systems embodying my invention, in comparison with that of prior-art systems.

In the embodiment of my invention shown in Fig. 1, a metallic-wire electrode 1 is fed by rolls 2, to or from the work 3 to be welded, an arc 4 being maintained between the electrode and the work. Direct-current energy is supplied to the arc, through a stabilizing resistor 5, from constant-potential supply mains 6 and 7, in a manner well understood in the art.

The feed rolls 2, are driven, through a gear reduction system 8, by a variable-speed, reversible, direct-current motor 9. Armature brushes 10 and 11 of the electrode-feed motor 9 are connected, by leads 12 and 13, to a variable-voltage generator 14. The field coil 15 of the feed motor 9 is connected, through resistances 16 and 17, to the supply mains 6 and 7. The generator 14 is part of a motor-generator set, the motor 18 of which is connected to the main source of supply by leads 19 and 20. The generator 14 has a field coil 21 which is connected in series with a resistor 22 to effect a bridging circuit between the electrode 1 and the mid-point 23 between resistors 16 and 17. Thus, the generator field coil 21 is energized only when the arc potential is greater or less than the total potential across the motor-field coil 15 and the resistor 16.

The circuit shown in Fig. 1 is a Wheatstone bridge having legs A (5) and B (1, 4, 3) constituting the arc or power circuit, legs C (17) and D (16, 15) constituting the control circuit and a connection E (22, 21) serving as the bridging member between the midpoints of the power and control circuits.

The resistors 16 and 17 are chosen to have such values that the potential drop across the leg D (16, 15) of the bridging contact is equal to some desired arc voltage. Under this condition, when the potential across leg B on the arc, is equal to the predetermined potential across leg D, no current passes through the generator field circuit E, with the result that no potential is produced by generator 14, and the feed motor 9 is stationary.

With a variation in arc potential, either above or below the predetermined potential, current flow is established in the bridging circuit E, either towards or from the midpoint 23, thus generating a positive or negative potential in the dynamo-electric system shown, to cause the motor 9 either to feed the electrode towards the work or to retract it from the work. As the field winding 21 may be wound for extremely low voltages, it is possible to obtain great sensitiveness of control and to multiply the unbalanced energy passing through the bridging circuit. I am thus able to obtain a sufficiently large amount of power to effect a quick response of the feed motor to arc-voltage changes under all welding conditions.

Fig. 2 shows a modification wherein the single source of constant-potential energy shown in Fig. 1 is replaced by two separate sources of constant-potential energy. Energy for the control circuit, comprising legs C and D, is derived from supply mains 24, 25 energized by any suitable source of constant-potential direct current, such as a small direct-current generator 25a, a battery or a battery-eliminator set, such as is used in A. C. radio sets. Energy for the power circuit, comprising legs A and B of the Wheatstone bridge arrangement, is supplied from mains 26, 27, energized by the welding generator 27a.

In this arrangement, the resistors 5 and 17 may be chosen to utilize the most economical power sources suitable for the operation of each circuit. It is apparent that the voltage of the midpoint 23 may be altered by changing the adjustment of resistors 16 and 17 and that, if an adjustable voltage generator is used as a source of energy for the circuit, resistor 17 may even be omitted. Moreover, since the purpose of resistor 5 is merely to stabilize the arc 4 when operating from a source of constant-potential energy, and thus to maintain, in effect, a flow of constant current in the power circuit, I may omit resistor 5 and substitute for the constant-potential source a constant-current generator supplying energy directly to leg B of the Wheatstone-bridge circuit, thus materially simplifying that circuit.

These quite obvious modifications of the circuit shown in Fig. 2 are illustrated in Fig. 3, wherein leads 28, 29 supply constant-current energy to the arc circuit, and leads 30 and 31 supply variable-voltage energy from an adjustable-voltage generator 31a to the control circuit.

The circuit shown in Fig. 4 is identical with that shown in Fig. 3 except for the addition of a field coil 32 for the feed motor. This coil 32 is connected in series with the arc circuit to augment the flux produced by coil 15, particularly, under the condition when the electrodes are in contact and it is desired to obtain a high torque for the purpose of separating the welding electrodes. The increased torque available may be needed whenever there is a tendency for the wire electrode to weld or "freeze" to the surface of the work material upon making contact therewith.

The circuit shown in Fig. 5 is substantially the same as that shown in Fig. 3, except that the field coil 15 of the feed motor is excited from the constant-potential mains 30 and 31 to provide for a constant flow of current through the motor field, independent of the adjustment of resistors 16 and 17.

In the schematic diagram shown in Fig. 6, I have illustrated the application of my energy-multiplying system to a modified circuit in which I utilize the resultant flux developed by two opposed separately excited field windings. In this system, the flux produced by the generator field coil 33, connected across the constant-potential supply mains 34—35 is opposed by the flux generated by an auxiliary generator field coil 36, connected directly across the arc. The potential developed at the terminals of the generator 14 is applied to the motor 9 to effect the feeding or retraction of the electrode wire in the manner already described.

Fig. 7 shows a still further modification wherein the energy for both the welding and the control circuits is derived from a motor 40 which may be driven from an alternating-current line 41. The motor 40 drives a welding generator 43 and a control-circuit generator 45, the former feeding the welding electrodes 1 and 3, and the latter feeding the feed-roll motor 9.

Any suitable control means for properly varying the excitation of the control-circuit generator 45 may be adopted, six such means being shown in the preceding figures of the drawing. However, by way of further illustration, a seventh control means is shown in Fig. 7, wherein the control-circuit generator 45 is provided with two opposing field windings 47 and 48, the winding 47 being more or less constantly excited from the constant-potential direct-current line 34—35, and the opposing winding 48 being energized by the arc current.

It will be noted that the constantly excited winding 47 of Fig. 7 is connected oppositely to the way in which the constantly excited winding 33 of Fig. 6 is connected. In Fig. 6, when the constantly excited winding 33 prevails, by reason of too short an arc, the feeding motor 9 must be energized to retract the electrode 1, whereas, in Fig. 7, when the constantly excited winding 47 prevails, by reason of too small welding current or too long an arc, the feeding motor 9 must be energized to advance the electrode 1.

If desired, the constant-potential direct-current line 34—35 may be derived from the alternating-current line through a bank of copper-oxide rectifiers 50, or the like.

The improvement in the response of the motor speed to variations in a function of the arc energy, resulting from my invention, is shown by curve chart, Fig. 8, wherein the abscissae represent arc voltages and the ordinates motor speeds, when either feeding or retracting the fusible electrode. Curve 100 of the chart shows the speed-response characteristics of prior devices, and curve 200 the characteristic of devices utilizing my invention. These curves are shown crossing the abscissae at some predetermined desired arc-potential, under which condition, the speed of the electrode feeding motor is zero. Any variation of arc voltage, above or below this value, will cause the motor to feed or to retract the welding electrode at the rate indicated by the curves.

The systems of the prior art required that the entire energy for the operation of the feed motor should be derived from the bridging connection of the Wheatstone-bridge circuit. Since the energy traversing this circuit is determined by the voltage difference between the arc and control circuits, and, as such differential should be small to maintain a substantially constant arc length, the operation of the feed motor in this case was quite sluggish. However, in my improved system, the energy required for the operation of the feed motor is derived from the supply mains, the energy-flow from the arc circuit resulting from unbalanced potentials or fluxes being utilized to vary the output of energy from the motor-generator set. Thus, a more effective means is provided for obtaining the desired character of response of the electrode-feeding mechanism to arc variations.

During the maintenance of the arc, I am primarily concerned with limiting the increment in arc voltage necessary to bring the feed motor from a stationary position to running speed, either forward or reverse. In the system of the above-mentioned Sparrow patent, for example, this potential interval has been found to be of the order of plus or minus eight volts, whereas, by means of my dynamo-electric energy-multiplying system, I am able to obtain an equivalent motor operation with a change in arc voltage of only about plus or minus 1.5 volts. In consequence, I am able to follow arc variations more rapidly and thus, under high-speed welding conditions, maintain a more uniform and constant arc length.

My improved system has the further advantage of inherent flexibility in design which enables me to modify the shape of the speed-response curve to meet specific requirements of high-speed operation. Curve 100 shows a linear relation between arc voltage and motor speed. With a system having this characteristic, it is evident that the speed of feeding the electrode at the high gap voltage existing under an open-circuit condition will exceed many times that obtained after the arc is drawn. I have found that, when the prior-art system is adjusted for high-speed welding, the electrode will be fed, on open circuit, at such a high rate of speed that its impact with the work surface will cause the electrode to rebound so rapidly that no arc can be established between the electrodes. The automatic characteristic of the circuit will cause the electrode to continue to strike the work and rebound, the only effect of such repeated impacts being, not to establish an arc, but to curl the ends of the electrodes to effect a further increase in the thermal capacity of the terminal and still further remove the possibility of striking an arc.

I am enabled to overcome this difficulty by saturating the field of generator 14 under the condition of a large unbalanced electrode potential such as exists on open circuit. In consequence, the multiplying factor at high electrode potentials is less than at lower potentials. This enables me to effectively prevent excessive feeding speed of the fusible electrode under open-circuit condition while maintaining a high feeding speed under arc-operating conditions.

I claim as my invention:

1. An electric arc welding system comprising means for feeding a fusible welding electrode to work on which a welding operation is to be performed, a source of arc potential connected to the electrode, means comprising an independent source of potential connected to said feeding means and to the source of arc potential to operate the feeding means at a rate depending upon variations in a function of the energy at the arc, and dynamo-electric means controlled by the arc potential and the independent source of potential for multiplying said variations.

2. An automatic arc welding machine comprising a feed device for an electrode, means including a reversible electric motor for operating said feed device, a dynamo-electric energy-multiplying means connected to supply energy to said motor, means for varying the voltage of said energy-supplying means comprising a resistor connected in shunt circuit relation with the welding arc, one terminal of which is connected to an arc terminal, a supply of substantially constant-potential energy connected to said resistor, a bridging member connecting the second terminal of said resistor to the second terminal of the arc, and a field coil, in said bridging member, forming a part of the said dynamo-electric energy-multiplying system.

3. An electric arc-regulating system for feeding and retracting electrodes comprising an electrode-feed device, means comprising a reversible electric motor for operating said feed device, a generator connected electrically to the motor and means for controlling the direction and speed of rotation of the said motor in accordance with variations in arc potential, said means comprising a source of constant potential supplying energy to a control circuit consisting of a resistor and a field coil of the said feed motor, a source of constant current supplying energy to the arc circuit, a common connection between one terminal of the source of constant potential and one terminal of the arc, a bridging connection between the remaining terminals of said resistor and the remaining electrode permitting an exchange of energy between the said source of constant current and the source of constant potential in accordance with the variation of the arc potential from a predetermined value, and a field coil connected to be energized by said flow of energy to cause the voltage of the generator impressed upon the feed motor to vary in some multiple of said departure in arc potential.

4. In an electric arc system, the combination with an arc-electrode and means comprising a feed-roll motor for advancing and retracting the arc-electrode, of a generator connected to supply driving energy to said feed-roll motor, a motor disposed to drive said generator, means for deriving a relatively small amount of electrical energy from the arc and utilizing it in such manner as to excite the said generator in the one or the other direction in accordance with the departure of the electrical condition of the arc from a predetermined state, and electroresponsive means independent of the generator voltage for increasing the starting torque of said feed-roll motor when the arc-electrodes are together.

5. An electric arc welding system comprising, a direct-current welding generator, a metallic arc welding electrode connected to the generator and disposed to strike an arc between it and work on which a welding operation is to be performed, said work constituting a second welding electrode also connected to the generator, a direct-current electric motor having driving connection with said metallic electrode for feeding it to the work, a field winding for said motor disposed to be energized from a source of potential separate from the welding generator, an additional direct-current generator connected to said feed motor for causing it to advance or retract said metallic electrode relative to the work, a circuit connected to said separate source of potential, and a separately excited field winding for said additional generator characterized by a connection between one of the welding electrodes and said circuit for utilizing a differential voltage and applying it to the excitation of said additional generator.

6. An electric arc welding system comprising a direct-current welding generator, a metallic arc welding electrode connected to the generator and disposed to strike an arc between it and work on which a welding operation is to be performed, said work constituting a second welding electrode also connected to the generator, a direct-current electric motor having driving connection with said metallic electrode to feed it to the work, a field winding for said motor disposed to be energized from a source of potential separate from the welding generator, an additional direct-current generator connected to said feed motor for causing it to advance or retract said metallic electrode relative to the work, a circuit connected to said separate source of potential, a separately excited field winding for said additional generator characterized by a connection between one of the welding electrodes and said circuit for utilizing a differential voltage and applying it to the excitation of said additional generator, and means for increasing the excitation of said feeding motor when the voltage applied to the welding electrodes is substantially equal to zero.

7. An automatic arc welding device comprising a welding electrode, means disposed to engage the electrode and to feed it to work to be welded, an electric feed motor operatively connected to the feeding means, a source of welding current connected to the electrode and to the work to impress an electrical potential for maintaining an arc therebetween, a generator having field and armature windings for supplying current to the feeding motor, said armature winding being connected to the motor, a second motor operatively connected to drive the generator, a separate source of electrical energy connected to the last named motor, and an electrical system associated with the welding current source and the separate energy source for exciting the field winding of the generator in response to differences in potential between the arc potential and the potential supplied by the separate source of energy, whereby the generator will supply current to the feed motor to actuate it in such manner that the electrode will be moved relative to the work to establish a predetermined arc length and to readjust the arc potential to equal that of the separate source.

8. An automatic arc welding device comprising a welding electrode, means for impressing an electric potential for maintaining an arc between the electrode and work to be welded, a reversible feed motor connected to the electrode for feeding it to the work, a generator electrically connected to the feed motor for providing the energy to operate it, a driving motor connected to a separate source of electrical energy and operatively connected to drive the generator, and means responsive to the potential difference between the arc potential and the potential supplied by the separate source of electrical energy for controlling the generator to operate the feed motor in such manner that a substantially uniform distance is maintained between the electrode and the work being welded.

9. An automatic arc welding device for feeding a welding electrode comprising, feeding means engaging the electrode for feeding it to work on which a welding operation is to be performed, a source of electrical energy connected to the electrode and to the work for impressing an electrical potential therebetween and for supplying welding current, an electric motor provided with an armature having driving connection with the feeding means to effect the feeding of the electrode relative to the work, a generator having an armature connected in loop circuit relation to said motor armature to supply current thereto, a second motor having driving connection with the generator, a second source of electrical energy connected to the second motor for energizing it, and means responsive to the electrical potential between the welding electrode and the second source of electrical energy for energizing the generator to actuate the electrode feeding means in such manner that the potential between the electrode and the work will be maintained at a substantially constant predetermined value.

10. An electric arc welding system comprising a welding electrode disposed adjacent to work to be welded, a welding generator connected to the electrode and to the work to impress a direct-current arc sustaining potential there-between, means including a motor disposed to feed the electrode to the work, a feeding generator, having a field winding, connected to supply energy to the feeding motor, means including a separate source of direct-current electrical energy for driving the generator, a conductor connecting one pole of said separate source of energy to the work being welded, a resistance element connected to the poles of the separate source, and a circuit including the field winding of the feeding generator for connecting the resistor to the electrode whereby a difference between the potential drop in the arc and the potential drop in the resistance element will result in a potential drop across the feeding generator field which will energize the generator to actuate the electrode in the direction to reestablish a predetermined potential drop in the arc.

11. An electric arc welding system comprising, in combination, a welding circuit comprising a movable welding electrode and work on which a welding operation is to be performed, said work constituting a second welding electrode, a source of potential connected to the welding circuit for maintaining a welding arc between the welding electrodes, a direct-current motor having driving connection with the first-named electrode, a field winding for said motor disposed to be energized from a second source of potential, a direct-current generator connected to the motor to cause it to advance or retract the movable electrode relative to the work, a resistor connected to the second source of potential and having one terminal connected to the second welding electrode, and a field winding for the generator having one terminal connected to the movable electrode and the other terminal connected to a point on said resistor the potential of which relative to the potential of the second electrode is substantially equal to a predetermined arc potential.

12. An electric arc welding system comprising, in combination, a welding circuit comprising a movable welding electrode and work on which a welding operation is to be performed, said work constituting a second welding electrode, a source of potential connection to the welding circuit for maintaining a welding arc between the welding electrodes, a direct-current motor having driving connections with the first-named electrode, a field winding for said motor disposed to be energized from a second source of potential, a direct-current generator connected to the motor to cause it to advance or retract the movable electrode relative to the work, a resistor connected to the second source of potential and having one terminal connected to the second welding electrode, a field winding for the generator having one terminal connected to the movable electrode and the other terminal connected to a point on said resistor the potential of which relative to the potential of the second electrode is substantially equal to a predetermined arc potential, and means for increasing the torque developed by the motor when the arc voltage is substantially equal to zero.

13. In an electric arc welding system, in combination, a welding circuit comprising a movable welding electrode and work on which a welding operation is to be performed, said work constituting a second welding electrode, a source of direct-current potential connected to the electrodes for maintaining a welding arc therebetween, feeding means for the movable electrode, a feed motor disposed to operate the feeding means and provided with an armature and a field winding, a generator disposed to supply energy to the feed motor and provided with an armature and a field winding, the armatures of the feed motor and the generator being connected in series circuit relation, a second source of direct-current potential having one terminal connected to the work, a circuit comprising a plurality of resistors and the field winding of the feed motor connected in series circuit relation and to the second source of potential and a bridging circuit, including the field winding of the generator, connected to the movable electrode and to a point on the resistors the potential of which, relative to the potential of the work, is substantially equal to a predetermined arc potential.

14. In an electric arc welding system, in combination, a welding circuit comprising a movable welding electrode and work on which a welding operation is to be performed, said work constituting a second welding electrode, a source of direct-current potential connected to the electrodes for maintaining a welding arc therebetween, feeding means for the movable electrode, a feed motor disposed to operate the feeding means and provided with an armature and a field winding, a generator disposed to supply energy to the feed motor and provided with an armature and a field winding, the armatures of the feed motor and the generator being connected in series circuit relation, a second source of direct-current potential having one terminal connected to the work, a plurality of resistors and the field winding of the feed motor connected in parallel circuit relation and to the second source of potential, and a bridging circuit, including the field winding of the generator, connected to the movable electrode and to a point on the resistors the potential of which, relative to the potential of the work, is substantially equal to a predetermined arc potential.

15. An automatic arc welding machine for feeding a welding electrode to work on which a welding operation is to be performed comprising, in combination, a stabilizing resistor having one terminal connected to the welding electrode, a constant potential energy source connected to the remaining terminal of the stabilizing resistor and to the work, feeding means disposed to operatively engage the welding electrode, a feed motor provided with an armature and a field winding and having driving connection with the feeding means, a control generator provided with an armature and a field winding for controlling the operation of the feed motor, the armatures of the feed motor and the control generator being connected in series circuit relation, a plurality of control resistors and the field winding of the feed motor connected in series circuit relation and to the constant potential energy source, circuit means for connecting the field winding of the control generator to the welding circuit and to the circuit including the control resistors, and a motor having driving connection with the control generator for rotating the armature thereof at substantially constant speed.

16. An automatic arc welding machine for feeding a welding electrode to work on which a welding operation is to be performed comprising, in combination, a stabilizing resistor having one terminal connected to the welding electrode, a constant potential energy source connected to the remaining terminal of the stabilizing resistor and to the work, feeding means disposed to operatively engage the welding electrode, a feed motor provided with an armature and a field winding and having driving connection with the feeding means, a control generator provided with an armature and a field winding for controlling the operation of the feed motor, the armatures of the feed motor and the control generator being connected in series circuit relation, a plurality of control resistors and the field winding of the feed motor connected in series circuit relation and to the constant potential energy source, circuit means for connecting the field winding of the control generator to the welding circuit and to the circuit including the control resistors, whereby the variations in arc potential between the welding electrode and the work may be reflected in the magnitude and polarity of the voltage impressed on the armature of the feed motor to vary the operating conditions thereof, and a motor having driving connection with the control generator for rotating the armature thereof at substantially constant speed.

17. In an automatic arc welding system in which a welding electrode is fed to perform a welding operation on work, in combination, a welding circuit comprising a stabilizing resistor, and the welding electrode and the work connected in series circuit relation, a control circuit comprising a plurality of resistors connected in series circuit relation, a source of constant potential energy connected to the welding and control circuits, feeding means disposed to engage the electrode, a feed motor provided with a separately excited field winding and an armature and having driving connection with the feeding means, a control generator provided with an armature and a field winding for controlling the operation of the feed motor, the armatures of the feed motor and the control generator being connected in series circuit relation, circuit means for connecting the field winding of the control generator to the welding circuit and to the control circuit, and a motor having driving connection with the control generator for rotating the armature thereof at substantially constant speed.

18. In an automatic arc welding system in which a welding electrode is fed to perform a welding operation on work, in combination, a welding circuit comprising a stabilizing resistor and the welding electrode and the work connected in series circuit relation, a control circuit comprising a plurality of resistors connected in series circuit relation, a source of constant potential energy connected to the welding and control circuits, feeding means disposed to engage the electrode, a feed motor provided with a separately excited field winding and an armature and having driving connection with the feeding means, a control generator provided with an armature and a field winding for controlling the operation of the feed motor, the armatures of the feed motor and the control generator being connected in series circuit relation, circuit means for connecting the field winding of the control generator to the welding circuit and to the control circuit, whereby the variations in arc potential between the welding electrode and the work may be reflected in the magnitude and polarity of the voltage impressed on the armature of the feed motor to vary the operating conditions thereof, and a motor having driving connection with the control generator for rotating the armature thereof at substantially constant speed.

19. A device for mechanically operated arc welding consisting of a work piece, an electrode, an electric motor with an armature, means to feed and withdraw said electrode by movement of said armature, a generator with an armature, uninterrupted conductors between the armatures of the generator and motor, a field structure in said generator and means to vary automatically in size and direction the field in said structure dependent on the voltage between electrode and work piece.

20. A device for mechanically operated arc welding consisting of a work piece, an electrode, rolls driving the electrode, an electric motor with an armature geared to said rolls, a generator with an armature, uninterrupted conductors between the armatures of the generator and motor, a field structure in said generator and means to vary automatically in size and direction the field in said structure dependent on the voltage between electrode and work piece.

21. A device for mechanically operated arc welding consisting of a work piece, an electrode, an electric motor with an armature, means to drive said electrode by movement of said armature, a generator with an armature, uninterrupted conductors between the armatures of the generator and motor, a field structure in said generator and means to control the field in said structure dependent on the voltage between electrode and work piece in such a manner that the field strength varies in size and direction with the difference of said voltage from a predetermined value.

22. A device for mechanically operated arc welding consisting of a work piece, an electrode, rolls driving the electrode, an electric motor with an armature geared to said rolls, a generator with an armature, uninterrupted conductors between the armatures of the generator and motor, a field structure in said generator and an automatic regulator controlling the field in said structure dependent on the voltage between electrode and work piece in such a manner that the field strength varies in size and direction with the difference of said voltage from a predetermined value.

23. A device for mechanically operated arc welding consisting of a work piece, an electrode, an electric motor with an armature, means to feed and withdraw by the movement of the armature said electrode, a generator with an armature, conductors between the armatures of the generator and motor, the generator having an exciting coil and means to vary automatically the amount and direction of the current through said exciting coil in accordance with the voltage between the electrode and work piece.

24. A device for mechanically operated arc welding comprising a work piece, an electrode and an electric motor with an armature, means to feed and withdraw by the movement of the armature said electrode, a regulator acting under the influence of the voltage between electrode and work piece, a generator with a field structure and an armature, uninterrupted conductors between the armatures of generator and motor, said regulator controlling the excitation of the field structure in such a manner that the excitation varies from a high positive value at high arc voltage to a negative value at excessively low arc voltage.

WILLIAM R. HARDING.